(12) United States Patent
Beauchamp et al.

(10) Patent No.: US 7,386,666 B1
(45) Date of Patent: Jun. 10, 2008

(54) GLOBAL SPARING OF STORAGE CAPACITY ACROSS MULTIPLE STORAGE ARRAYS

(75) Inventors: Robert Beauchamp, Framingham, MA (US); Robert Solomon, Kensington, NH (US); Jeffrey A. Brown, Shrewsbury, MA (US)

(73) Assignee: EMC Corporation, Hopkinton, MA (US)

( * ) Notice: Subject to any disclaimer, the term of this patent is extended or adjusted under 35 U.S.C. 154(b) by 252 days.

(21) Appl. No.: 11/241,166

(22) Filed: Sep. 30, 2005

(51) Int. Cl.
*G06F 12/00* (2006.01)
(52) U.S. Cl. .................................................. 711/114
(58) Field of Classification Search ................ 711/114; 714/6
See application file for complete search history.

(56) References Cited

U.S. PATENT DOCUMENTS

| | | | |
|---|---|---|---|
| 5,469,453 A * | 11/1995 | Glider et al. ................. | 714/6 |
| 7,028,216 B2 * | 4/2006 | Aizawa et al. ................ | 714/7 |
| 7,035,972 B2 * | 4/2006 | Guha et al. ................. | 711/114 |
| 7,146,522 B1 * | 12/2006 | Rowe et al. .................. | 714/6 |
| 2005/0283655 A1 * | 12/2005 | Ashmore ........................ | 714/7 |
| 2006/0036903 A1 * | 2/2006 | Dubal et al. .................. | 714/7 |
| 2006/0041782 A1 * | 2/2006 | Ali et al. ...................... | 714/6 |
| 2006/0075283 A1 * | 4/2006 | Hartung et al. ................ | 714/5 |

* cited by examiner

*Primary Examiner*—Hiep T Nguyen
(74) *Attorney, Agent, or Firm*—Guerin & Rodriguez, LLP; Mary M. Steubing

(57) ABSTRACT

High availability is provided in a multi-array storage system at the logical storage unit level. One or more storage arrays export logical storage units (LUNs). Each storage array maps the LUNs to physical groups of disks or disk partitions within the array. A controller coupled to the storage arrays arranges the LUNs from all the arrays so that one or more LUN(s) are designated as spare LUN(s). If a disk failure occurs within any disk in any array, the contents of one or more of the LUN(s) associated with the group of disks containing the failed disk are re-established on the spare LUN(s). If the physical groups of disks are RAID protected, then after affected LUNs are moved, the storage array containing the failed disk removes the failed disk from its group and re-establishes RAID protection across the remaining disks in the group.

14 Claims, 9 Drawing Sheets

GLOBAL SPARING OF STORAGE CAPACITY ACROSS MULTIPLE STORAGE ARRAYS

FIELD OF THE INVENTION

The present invention relates generally to the field of storage systems, and particularly to high availability in hierarchical storage systems.

BACKGROUND OF THE INVENTION

Today's enterprise data centers store ever-larger amounts of business critical data that must be immediately available and highly reliable. To meet reliability requirements for critical data, arrays of groups of disks are often employed. One type of array is known as a redundant array of independent disks (RAID array). Within a RAID array, data is distributed across groups of disks ("RAID groups") in a manner consistent with the RAID level implemented, from full redundancy to parity protection. Arrays output logical units of storage (LUNs) for use by hosts; thus, the RAID distribution of the actual data across disks is transparent to the hosts. A typical RAID array exports LUNS that map to RAID protected physical storage across a group of disks. One or more spare disks may be provided in the array. If a disk in a RAID group fails, one of the spare disks is used to restore the RAID group. Once the spare disks are all used, failed disks must be replaced in order to maintain RAID protection for the LUNs associated with the group.

Applications continually evolve and continually require greater storage capacity. It has now become necessary and reasonable to provide multiple arrays of disks as storage in the data center. As always, it is important to the storage systems provider to provide highly reliable storage solutions at the lowest possible cost. When many separate arrays are employed in a system, hundreds of LUNS may be exported from many groups of disks in each array. The spare drives in a given array are eventually rendered active because of array disk failures. Furthermore, the spare drives in a given array cannot be used by the groups of disks in the other arrays. The provision of one or more spare drives per array quickly becomes inadequate. It is desirable to reduce the expense and increase the reliability of the multi-array storage solution by implementing a more efficient strategy for storage capacity sparing.

SUMMARY OF THE INVENTION

In accordance with the principles of the invention, efficient high availability is provided in a multi-array storage system at the logical storage unit level. One or more storage arrays export logical storage units (LUNs). Each storage array maps the LUNs to physical groups of disks or disk partitions within the array. A controller coupled to the storage arrays arranges the LUNs from all the arrays so that one or more LUN(s) are designated as spare LUN(s). If a disk failure occurs within any disk in any array, the contents of one or more of the LUN(s) associated with the group of disks containing the failed disk are re-established on the spare LUN(s).

When the physical groups of disks are RAID protected, then a further aspect of the invention operates at the array level in the event of a disk failure, after the one or more LUNs has been moved. Accordingly, the storage array containing the failed disk removes the failed disk from its group and re-establishes RAID protection across the remaining disks in the group. The need to maintain spare disks for each group after a failure is thereby mitigated, thus lowering the overall cost of the system.

Together, the LUN sparing mechanisms herein presented serve to enhance scalability and decrease system costs.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

DETAILED DESCRIPTION OF EXEMPLARY EMBODIMENTS

Figure 1:
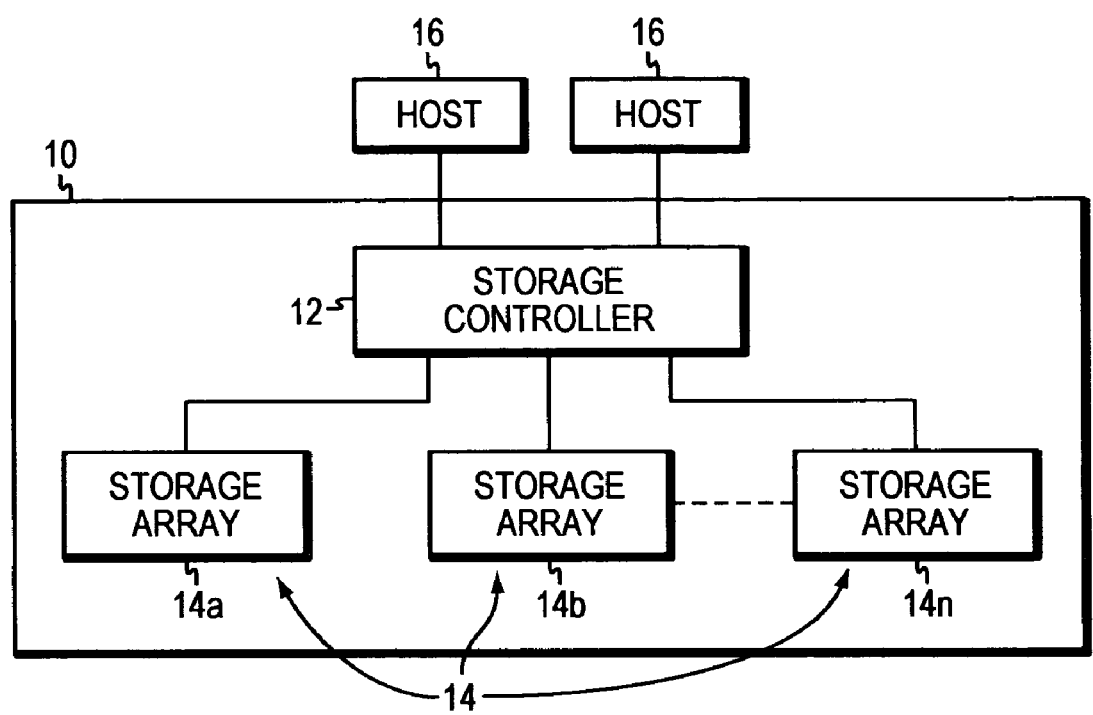
FIG. 1 is a representation of a storage system in accordance with the invention including multiple storage arrays coupled to a storage controller.

In FIG. 1 there is shown a functional block diagram of an exemplary storage system 10 in which the invention can be implemented. The storage system is composed of hierarchically coupled storage arrays. A front end (or "host facing") storage controller 12 is shown coupled to multiple storage arrays 14, herein individually labeled 14a-14n. In operation, the front end storage controller 12 is coupled to one or more hosts 16. The storage system 10 operates to provide units of logical storage for use by the hosts 16.

Figure 2:
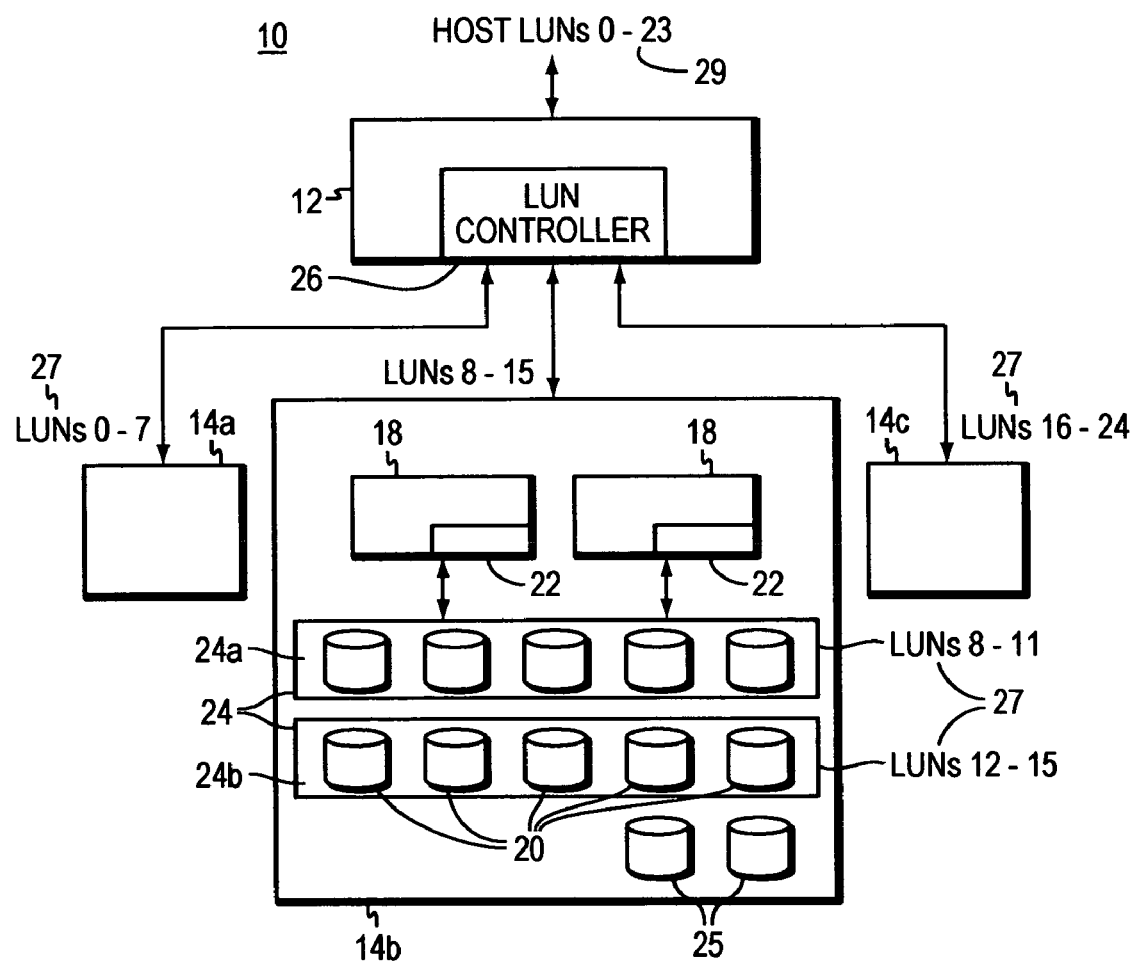
FIG. 2 is a representation of the storage system of FIG. 1, showing a storage array in more detail and showing the LUN controller of the invention.

A more detailed view of one of the storage arrays, 14b, is shown in FIG. 2. Each array 14 is preferably a RAID array ("Redundant Array of Independent Disks"). The RAID array uses any of the known RAID algorithms to provide high availability for the storage exported by the array. In FIG. 2 the array 14b is shown to include redundant storage processors 18 and multiple physical disk drives 20. RAID controllers 22 execute one of the several RAID algorithms to provide high availability across groups of disks 24a-24b. (Redundant RAID controllers are herein shown, but not required.)

The RAID function is performed in a transparent manner. The front end storage controller 12 does not have visibility into the array 14s' physical disk structure. Rather, the array 14 provides, or "exports", logical storage units (LUNs) 27 to its host interface—in this case, the front end storage controller 12. For example, the array 14b exports LUNs 8-15 to the storage controller 12. LUNs are logical partitions of the available physical storage capacity in the array 14. The RAID controller 22 serves to "translate" LUN accesses into physical accesses to the RAID arrayed disks 20. The storage controller 12 manipulates the LUNs exported by the array 14 as if they are in fact physical devices. The storage controller 12 exports Host LUNs 29 to the hosts 16. LUN configuration is highly flexible. LUNS may be mapped in many ways across the RAID groups in the array 14.

Figure 3:
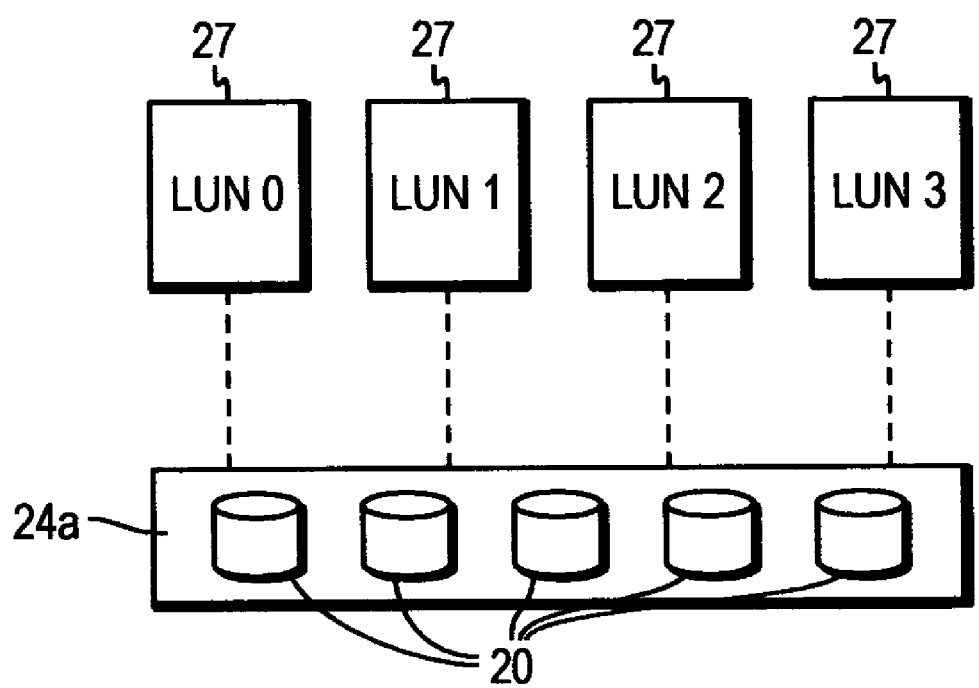
FIG. 3 is a representation of the mapping of LUNs to a group of disks.

A simple example of LUN mapping is shown in FIG. 3. In this example, the group of disks 24a is a RAID 4 group wherein four of the five disks 20 are used for data storage and one disk 20 acts to store parity. Each disk 20 is a 5 Gigabyte disk; thus, the group 24a has 20 Gigabytes of physical capacity available for data storage. Four 5 Gigabyte LUNs 0-3 are shown mapped to the group of disks 24a. Alternately, the group could be configured as five 4 Gigabyte LUNs, or eight 2.5 Gigabyte LUNs, or as one large LUN. If on the other hand the group 24a is a RAID 5 group, data and parity are striped across the five disks, thus the four LUNs are not mapped directly to any particular disk. There are many ways to configure LUNs across the groups of disks in an array, and the invention is applicable to any configuration. The LUN examples used herein are selected for clarity of explanation.

Referring back to FIG. 2, the array 14b is shown to include 12 physical disk drives 20. The disks 20 are arranged as two RAID groups 24a,b. Multiple LUNs are exported from each RAID group. LUNs 8-11 map to the RAID group 24a, and LUNs 12-15 map to the RAID group 24b. The two remaining drives are reserved as spare drives to replace any active drive that suffers a failure. The other arrays 14 are herein shown to be similarly arranged, exporting LUNs 0-7 and LUNs 16-24. Again, it should be understood that there are many other ways to arrange the LUNs. Each array 14 can differ in its physical capacity and can export more, fewer, larger, or smaller LUNs. The storage controller 12 may include disks and have similar functionality to the other arrays 14. Or, it may consist only of control functionality. In either event, the storage controller 12 serves to export the storage capacity that it may have and that the arrays 14 have in the form of Host LUNs 29 for use by the hosts 16. In accordance with the invention, a LUN controller 26 in the storage controller 12 provides efficient and highly reliable LUN service to the hosts 16 by providing sparing capability across the LUNs 27 exported to the storage controller 12 from all of the storage arrays 14.

Figure 4:
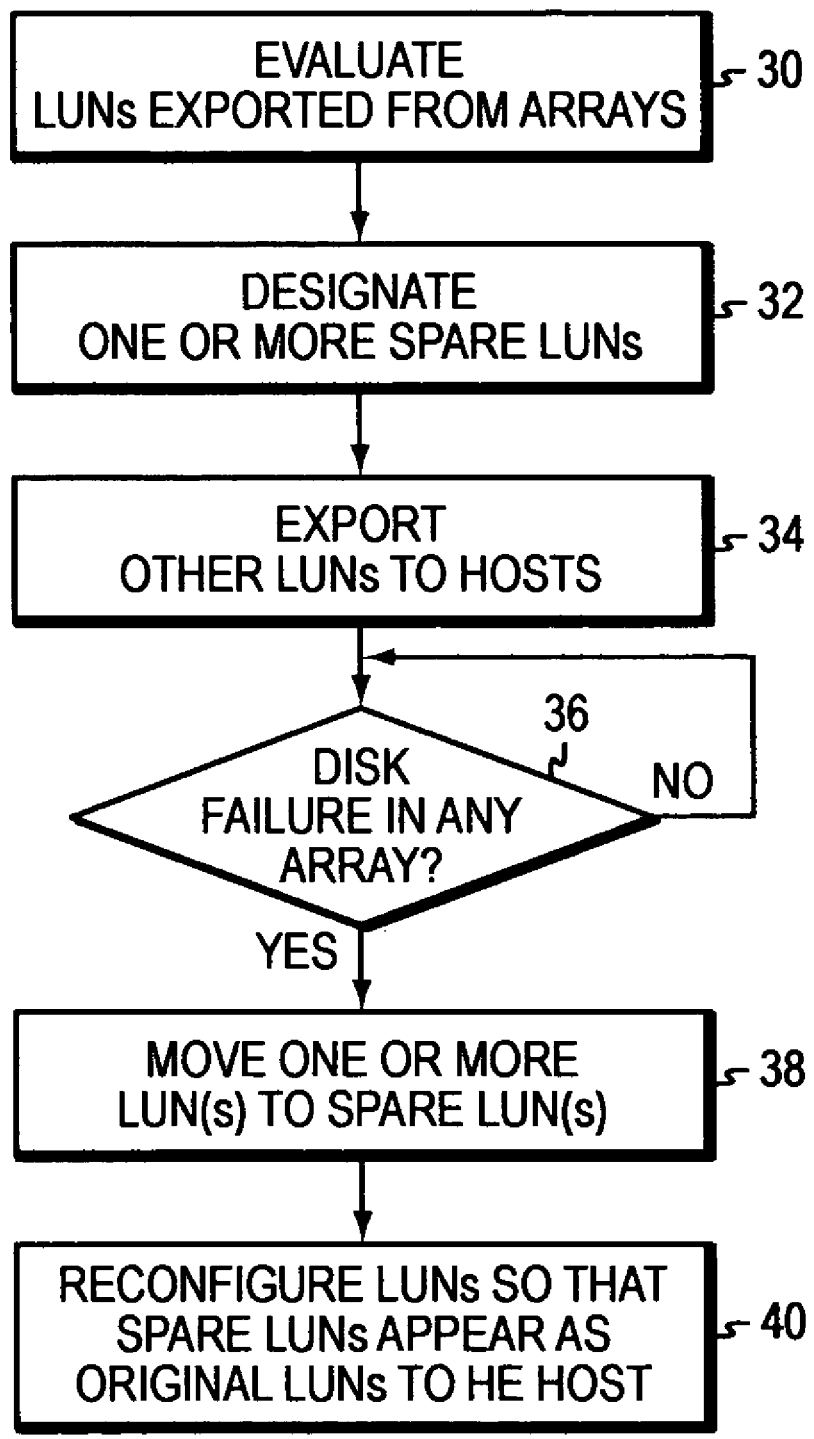
FIG. 4 is a flow diagram of the operation of the LUN controller.

The general operation of the controller 26 is shown in FIG. 4. The controller 26 in the storage controller 12 first evaluates the LUNs exported from all the arrays 14 to determine the size and number of spare LUNs to be provided (step 30). The controller 26 then designates one or more of the LUNs as spare LUN(s) (step 32). The remaining LUNs are exported as Host LUNs for use by the hosts 16 (step 34). During operation, if a disk failure occurs within any disk in any array (step 36), then the controller 26 causes one or more LUNs currently physically associated with the disk group 24 containing the failure to be re-established on the spare LUN(s) (step 38). The storage controller 12 then reconfigures its LUNs to cause the spare LUN(s) to appear to the hosts 16 as the same LUN(s) that were moved from the failed group 24 (step 40). That is, from the point of view of the hosts 16, the Host LUNS 29 have not changed. The reconfiguration is preferably transparent to the hosts 16.

It is particularly noted that the spare LUN(s) can be designated on any of the arrays 14. In this manner, LUN sparing is effective not only within a single array but across all the arrays 14 in the system 10. Spare storage capacity is thereby provided for use by the system as a whole.

Figure 5:
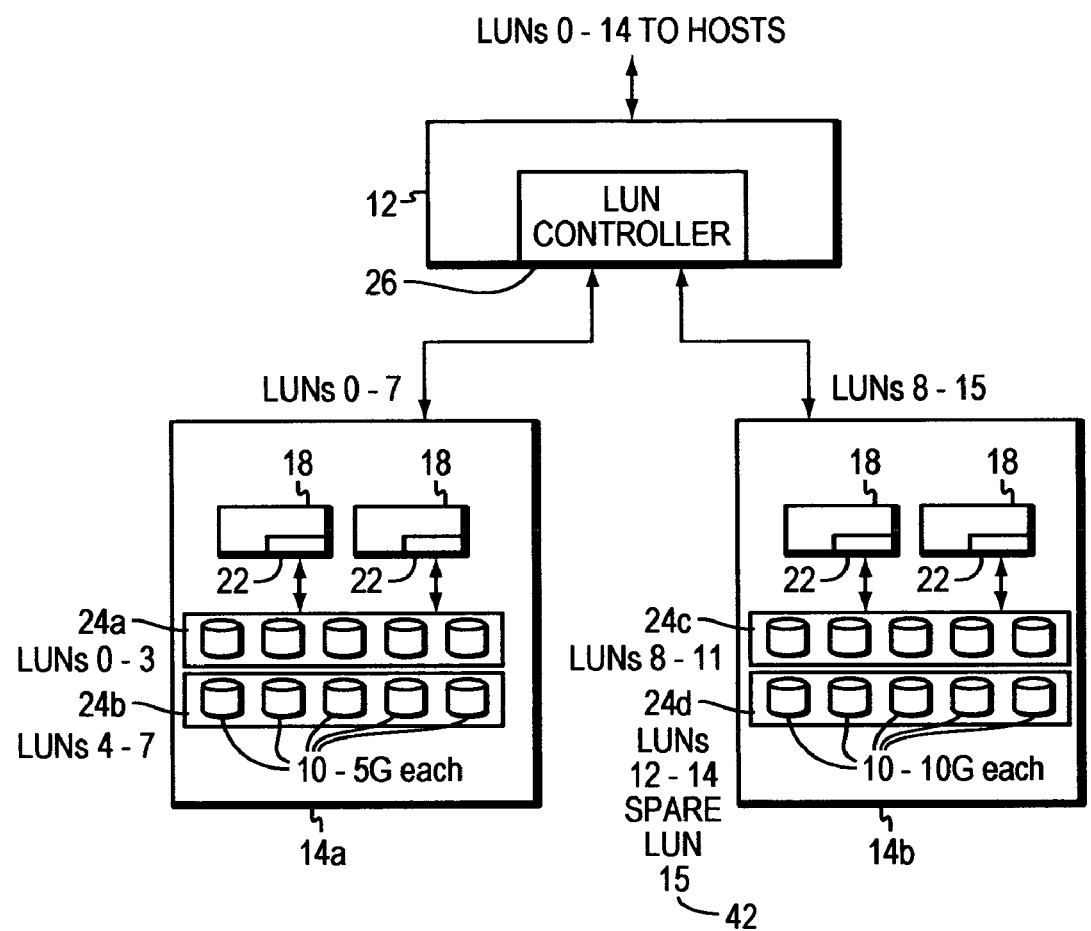
FIG. 5 is a representation of one example of LUN sparing provided by the LUN controller.
Figure 6:
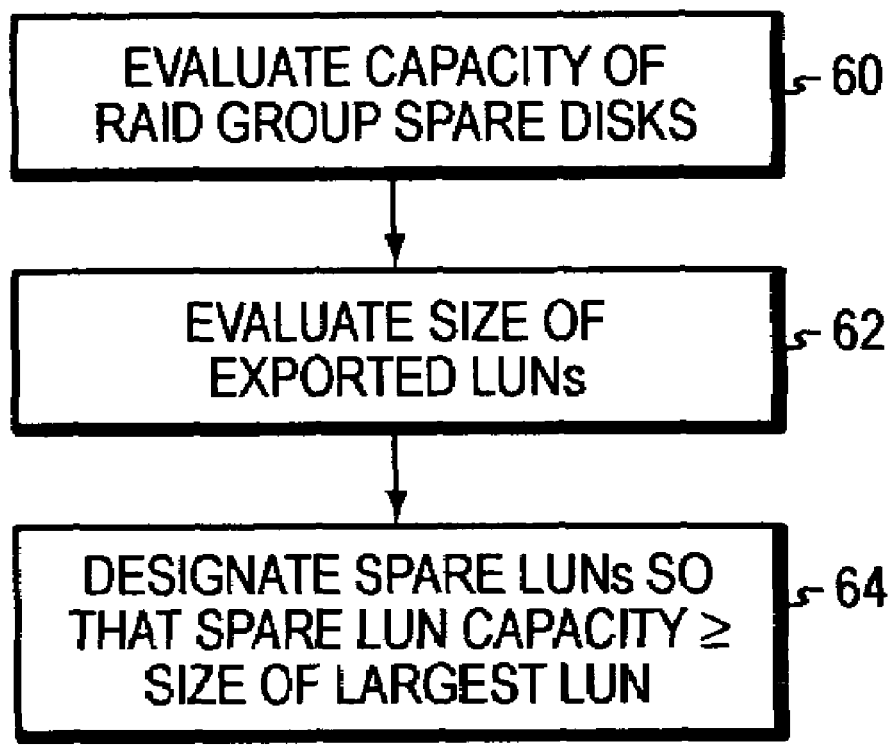
FIG. 6 is a flow diagram of the manner in which the LUN controller evaluates LUNs and designates spare LUNs.

An example of one way in which a LUN controller 26 can evaluate LUNs and designate spares is shown in FIG. 5 and the process of FIG. 6. The array 14a in FIG. 5 is shown to include ten 5 Gigabyte drives arranged into two 4+1 RAID 5 groups 24a,b. Four 5G LUNs are mapped to each group—thus eight LUNs 0-7 are exported. The array 14b is shown to include ten 10 Gigabyte drives arranged into four 4+1 RAID 5 groups 24c,d. Four 10G LUNs are mapped to each of these groups—thus eight LUNs 8-15 are exported. The controller 26 evaluates the capacity of a disk in a RAID group (FIG. 6 step 60) and the size of the LUNs available to it (FIG. 6 step 62). The controller 26 determines that a single disk failure in either array 14a,b would affect a maximum of 10G of physical capacity—that is, capacity for one 10G LUN or two 5G LUNs. In other words, the 10G LUNs 8-15 are large enough such that any LUN on either array 14a or 14b can be re-established on one of them. The controller 26 thus designates one 10G LUN 15 as a spare LUN 42 (FIG. 6 step 64) and exports LUNS 0-14 as Host LUNs 29 for use by the hosts 16. Now, if a drive failure occurs in any disk, for example one of the disks in group 24b, (FIG. 4 step 36), one LUN associated with the group 24b, for example LUN 4, is re-established on the spare LUN 15 (FIG. 4 step 38). The controller 26 configures the Host LUNs so that the spare appears as the LUN that was moved.

Figure 7:
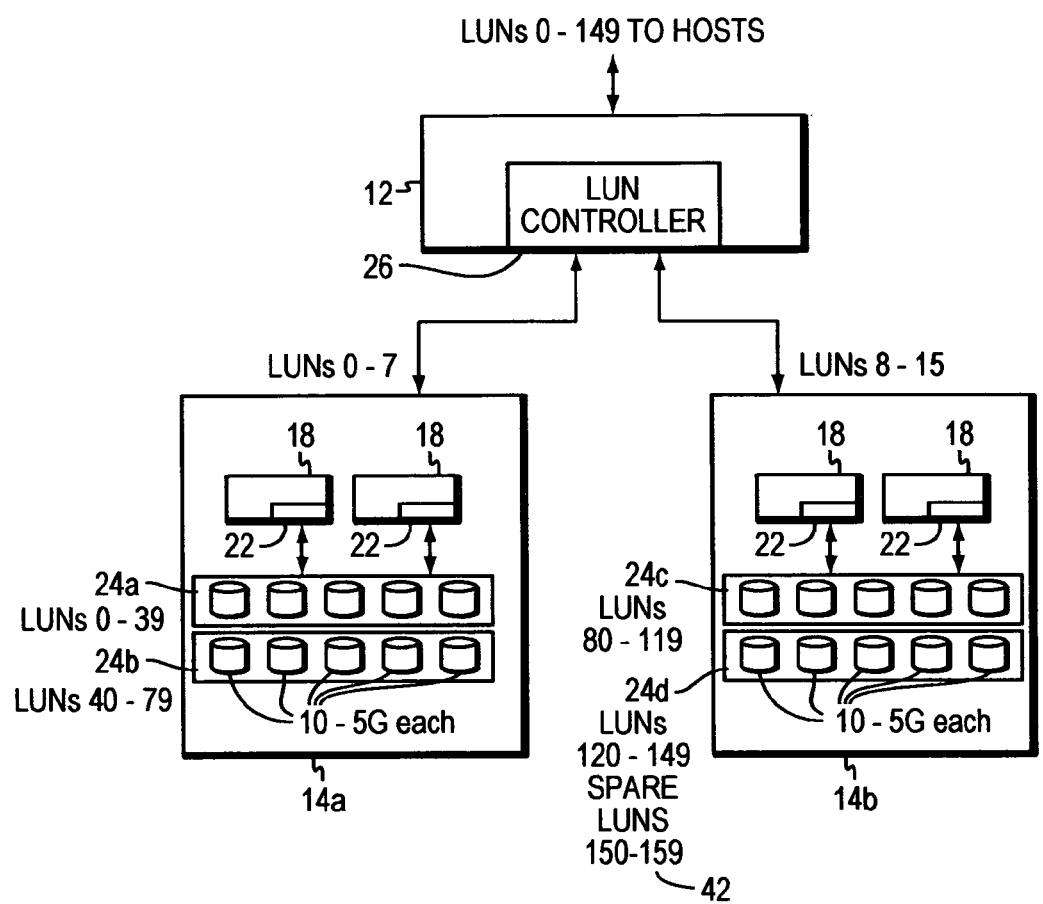
FIG. 7 is a representation of another example of LUN sparing provided by the LUN controller.

FIG. 7 depicts another example of LUN sparing by the controller 26 in accordance with the process of FIG. 6. In this example, LUN sizes are homogeneous throughout the system. As shown, 40 LUNs are mapped to each group of 5G disks in the array 14a, providing a total of 80 LUNs 0-79, each with a capacity of 0.5 G each. In the array 14b, 40 LUNs are also mapped to each group of 5G disks, providing another 80 LUNs 80-159, each with a capacity of 0.5 G each. The controller evaluates the RAID group spare capacity and the 159 available LUNs (FIG. 6 steps 60, 62) and finds that a disk failure in array 14a will affect 5G of physical space, and thus 10 LUNs worth of space in array 14a would be compromised. A disk failure in array 14b will also affect 5G of physical space, and thus 10 LUNs worth of space in array 14b would be compromised. The controller 26 determines that by setting aside any 10 of the LUNs, herein LUNs 80-159, enough spare capacity is provided to protect against a disk failure in either array 14a or 14b. The controller therefore designates LUNs 150-159 as spare LUNs 42 (FIG. 6 step 64), and exports LUNs 0-158 for use by the hosts. Thus, sufficient spare LUN capacity is provided such that all LUNs associated with a failure in either array 14a or 14b can be moved to the spare LUNs 42.

These are two simple examples of a sparing algorithm that might be employed by the controller 26. There are many other possible strategies to be chosen from in accordance with system requirements. For example, in systems employing many groups and many LUNs, it may be desirable to provide enough spare LUN capacity to support more than one failed disk. Or, it may be desirable to provide one spare LUN per array. In this case, the size of the spare LUN would depend on the sizes of the LUNs in its array, rather than the sizes of all LUNs in the system. Or, it may be desirable to more evenly distribute spare LUNs across arrays. Furthermore, a failed LUN can be spared by multiple smaller LUNs if the storage controller 12 can provide the aggregated view of those LUNs to the hosts. Generally, the decision of how many spare LUNs to reserve is a function of total storage capacity, expected failure rate, expected time to repair or add capacity, risk tolerance of the user, and cost considerations, amongst other things.

The LUN sparing capability of the invention enables several efficiencies in the arrays 14. In accordance with another aspect of the invention, when a failure occurs in a disk in a RAID group 24 in an array 14, one or more affected LUNs are moved as previously described. Then, the group is "collapsed" by the array into a smaller RAID group such that the remaining LUNs will remain RAID protected and thus highly available. Referring back to FIG. 2, some spare disks are provided to restore a RAID group in the case of a disk failure in the group. However, when the spare disks have all been used, RAID protection can fail if another disk fails. This aspect of the invention addresses this problem. Referring back for example to FIG. 4, the array 14a was shown to contain traditional RAID groups 24. Each group of disks 24a,b is arranged as a "4+1" RAID group, including 5 disks containing data and parity information. If one of the disks 20 in the 5 disks in group 24a fails, the inclusion of parity allows the array 14 to recover and continue to use the data for the RAID group 24a from the remaining 4 disks. If no spare disk is available, then RAID redundancy is compromised.

In the example of FIG. 4, which implements the previously described LUN sparing invention, if a disk failure occurs in array 14a, one LUN (for example LUN 0) is re-established by the controller 26 in the storage controller 12 to a spare LUN somewhere in the arrays 14. The RAID group including the failed disk need now only support the remaining three LUNs (those in the group 24a that were not moved—LUNs 1-3). In accordance with the new aspect of the invention, those remaining 3 LUNs are rebuilt on the remaining 4 disks 20 as a 3+1 RAID group; thus these remaining three LUNs 1-3 are once again fully RAID protected.

Figure 8:
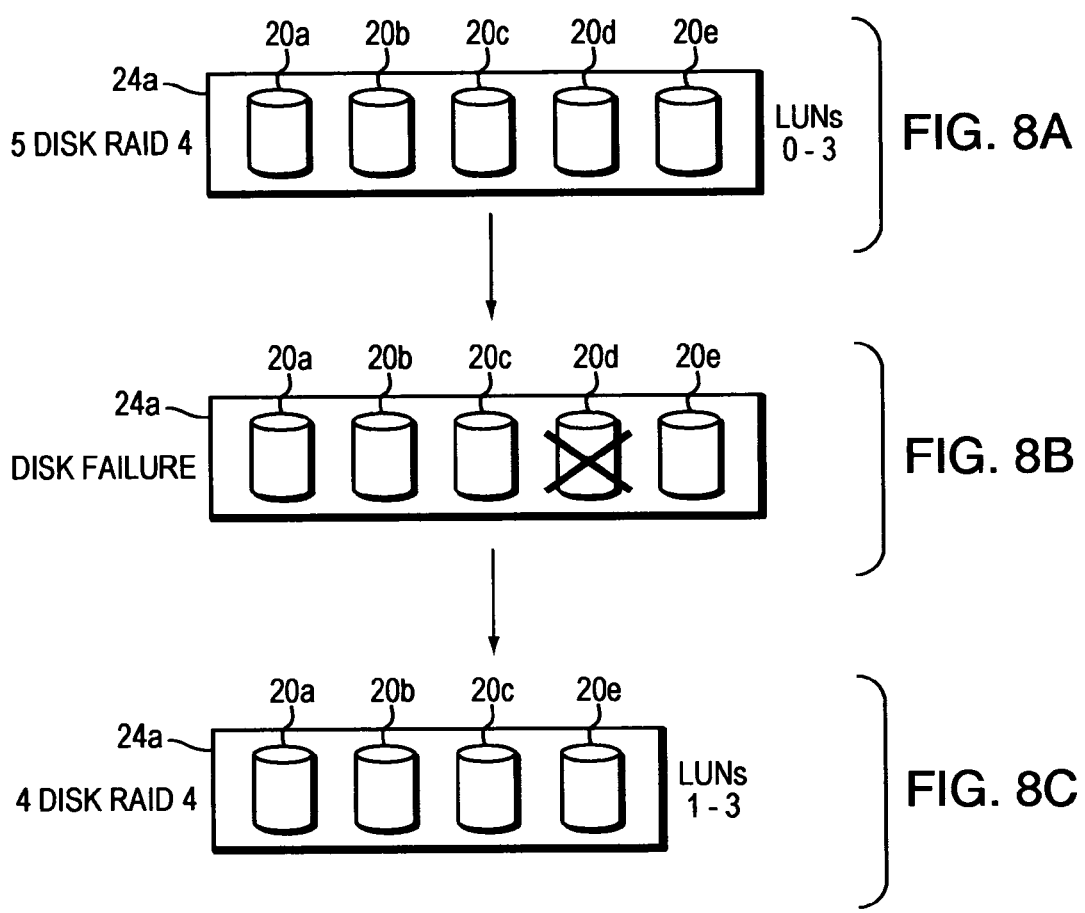
FIG. 8A is a representation of a 5 disk RAID group partitioned into four LUNs.
FIG. 8B is a representation of a failure of a disk in the RAID group of FIG. 7A.
FIG. 8C is a representation of a new 4 disk RAID group built from the remaining operational disks of FIG. 7B and partitioned into three LUNs.
Figure 9:
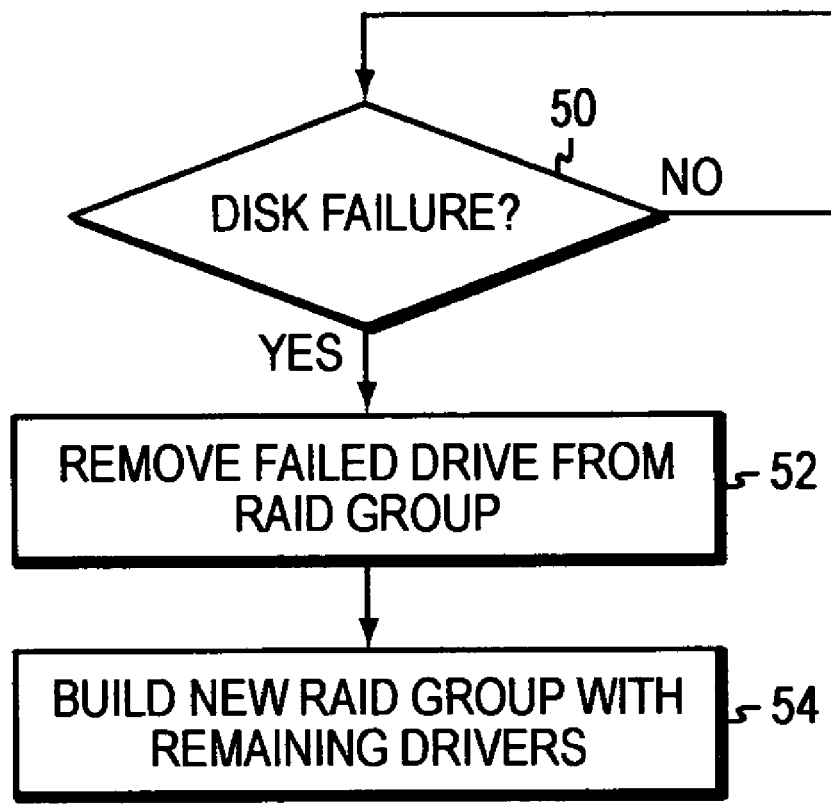
FIG. 9 is a flow diagram describing how a RAID group is collapsed in accordance with the invention.

The operation of an array 14 in response to a disk failure is shown in more detail in FIGS. 8A, 8B, 8C, and 9. In FIG. 8A, a five disk RAID 4 group is shown consisting of disks 20a-e across which LUNs 0-3 are arranged. Upon the failure of disk 20d (FIG. 8B, FIG. 9 step 50), one of the LUNs 0-3, for example LUN 0, is moved by the controller 26 as was explained with regard to the operation LUN sparing invention. The RAID controller 22 in the array 14 then removes the disk 20d from the RAID group 24a (FIG. 9 step 52) and builds a new RAID group of the drives 20a, b, c, and e (FIG. 8C, FIG. 9 step 54). The remaining LUNs 1-3 are now fully RAID protected.

There are several notable advantages of this aspect of the invention. First of all, by sparing at the LUN level and then collapsing RAID groups within the arrays to maintain high availability, the need to immediately replace spare disks is eliminated. As the number of RAID groups and arrays in a system increases, significant cost savings are achieved. Secondly, the ability to collapse RAID groups enables development of a "sealed" array 14. An array 14 can be manufactured to contain a certain number of disks 20. Upon a disk failure, after the controller 26 moves one or more LUNs, the RAID controller 22 in the array 14 can collapse the RAID group that includes the failed disk. This process can continue indefinitely, until less than two disks remain. Thus, in smaller systems, disk replacement can be delayed or eliminated. As storage systems grow to include ever more disks, disk replacement becomes unnecessary, and storage is expanded as needed by adding more sealed arrays. It is conceivable that, as disks become less expensive, sealed arrays can now be treated by a controller as disks have been.

Thus, as storage systems grow to include many arrays, a controller such as 26 might arrange the LUNs such that different forms of redundancy or high availability can be employed across them.

The present invention is not to be limited in scope by the specific embodiments described herein. Various modifications of the present invention, in addition to those described herein, will be apparent to those of ordinary skill in the art from the foregoing description and accompanying drawings. Though a storage system is presented herein as including a storage controller implementing the LUN controller, the LUN controller can reside in any type of system, or in a host. In a system including a single array, the LUN controller can be implemented within the array. Furthermore, the LUN controller can be implemented in hardware, software, or firmware, and may be instantiated monolithically as shown, or distributed between multiple controllers and/or the arrays themselves. The principles of the invention apply to LUNs mapped to any type of disk drive arrangement, including all types of RAID, and JBOD. One skilled in the art will understand that many specific implementations can be employed to achieve the logical functionality of the invention. All such modifications are intended to fall within the scope of the invention. Further, although aspects of the present invention have been described herein in the context of a particular implementation in a particular environment for a particular purpose, those of ordinary skill in the art will recognize that its usefulness is not limited thereto and that the present invention can be beneficially implemented in any number of environments for any number of purposes.

We claim:

1. A storage system comprising:
   one or more storage arrays, each storage array exporting logical storage units (LUNs), each storage array operative to map the LUNs to physical groups of disks or disk partitions within the array;
   a controller operative to:
   arrange the LUNs from the one or more storage arrays so that one or more LUN(s) are designated as spare LUN(s);
   if a disk failure occurs within any disk in any array, re-establish on the spare LUN(s) the contents of one or more of the LUN(s) associated with the group of disks containing the failed disk.

2. The storage system of claim 1 wherein the controller resides in a front end storage system to which the one or more storage arrays are coupled, and wherein the front end storage system exports Host LUNs to host systems.

3. The storage system of claim 1 wherein the physical groups of disks are RAID protected.

4. The storage system of claim 3 wherein, if a disk failure occurs, the storage array containing the failed disk performs the following operations on the group of disks containing the failed disk:
   remove the failed disk from the group;
   re-establish RAID protection across the remaining disks in the group.

5. A method comprising the steps of:
   providing one or more storage arrays, each storage array exporting logical storage units (LUNs), each storage array operative to map the LUNs to physical groups of disks or disk partitions within the array;
   designating one or more of the LUNs exported from the one or more storage arrays as spare LUN(s);
   if a drive failure occurs in any array, re-establishing one or more of the LUN(s) associated with the group of drives including the failed drive on the spare LUN(s).

6. The method of claim 5 wherein the steps of designating and re-establishing are performed by a controller residing in a front end storage system to which the one or more storage arrays is coupled.

7. The method of claim 5 wherein the physical groups of disks are RAID protected.

8. The method of claim 7 wherein the following steps are performed on the group of disks containing the failed disk:
reducing the physical group of disks by removing the failed disk;
re-establishing RAID protection across the remaining disks in the group.

9. A device comprising:
a controller for interfacing to one or more storage arrays, each storage array exporting logical storage units (LUNs), each storage array operative to map the LUNs to physical groups of disks or disk partitions within the array;
the controller operative to:
arrange the LUNs exported from the plurality of storage arrays so that one or more LUN(s) are designated as spare LUN(s);
if a disk failure occurs within any disk in any array, re-establish on the spare LUN(s) the contents of one or more LUN(s) associated with the group of disks containing the failed disk.

10. A program product comprising a computer readable medium having embodied therein a computer program for storing data, the computer program comprising:
logic for interfacing to one or more storage arrays, each storage array exporting logical storage units (LUNs), each storage array operative to map the LUNs to physical groups of disks or disk partitions within the array;
the logic operative to:
arrange the LUNs exported from the plurality of storage arrays so that one or more LUN(s) are designated as spare LUN(s);
if a disk failure occurs within any disk in any array, re-establish on the spare LUN(s) the contents of one or more LUN(s) associated with the group of disks containing the failed disk.

11. A method comprising the steps of:
Interfacing a controller to one or more storage arrays, each storage array exporting logical storage units (LUNs), each storage array operative to map the LUNs to physical groups of disks or disk partitions within the array;
Operating the controller to:
arrange the LUNs so that one or more LUN(s) are designated as spare LUN(s);
if a disk failure occurs within any disk in any array, re-establishing on the spare LUN(s) the contents of one or more of the LUN(s) associated with the group of disks containing the failed disk.

12. A device comprising:
a storage array operative to export logical storage units (LUNs), each LUN mapped to physical groups of disks or disk partitions within the array, wherein each physical group of disks is RAID protected;
the storage array designating one or more LUN(s) as spare LUN(s), the storage array exporting the remaining LUN(s);
The storage array operative upon a disk failure to perform the following operations:
re-establish on the spare LUN(s) the contents of one or more of the LUN(s) associated with the group of disks containing the failed disk;
remove the failed disk from the group;
re-establish RAID protection across the remaining disks in the group.

13. A program product comprising a computer readable medium having embodied therein a computer program for storing data, the computer program comprising:
logic on a storage array operative to export logical storage units (LUNs), each LUN mapped to physical groups of disks or disk partitions within the array, wherein each physical group of disks is RAID protected;
the logic designating one or more LUN(s) as spare LUN(s), the storage array exporting the remaining LUN(s);
The logic operative upon a disk failure to perform the following operations:
re-establish on the spare LUN(s) the contents of one or more of the LUN(s) associated with the group of disks containing the failed disk;
remove the failed disk from the group;
re-establish RAID protection across the remaining disks in the group.

14. A method comprising the steps of:
exporting logical storage units (LUNs) from a storage array, each LUN mapped to physical groups of disks or disk partitions within the array, wherein each physical group of disks if RAID protected;
designating one or more LUN(s) as spare LUN(s), the storage array exporting the remaining LUN(s);
upon a disk failure, performing the following operations:
re-establishing on the spare LUN(s) the contents of one or more of the LUN(s) associated with the group of disks containing the failed disk;
removing the failed disk from the group;
re-establishing RAID protection across the remaining disks in the group.

* * * * *